United States Patent
Niemelä

(10) Patent No.: US 11,436,326 B2
(45) Date of Patent: Sep. 6, 2022

(54) FALSE ALARM DETECTION FOR MALWARE SCANNING

(71) Applicant: WithSecure Corporation, Helsinki (FI)

(72) Inventor: Jarno Niemelä, Helsinki (FI)

(73) Assignee: WithSecure Corporation, Helsinki (FI)

( * ) Notice: Subject to any disclaimer, the term of this patent is extended or adjusted under 35 U.S.C. 154(b) by 10 days.

(21) Appl. No.: 16/899,132

(22) Filed: Jun. 11, 2020

(65) Prior Publication Data

US 2020/0394298 A1 Dec. 17, 2020

(30) Foreign Application Priority Data

Jun. 13, 2019 (GB) ........................... 1908462

(51) Int. Cl.
| | |
|---|---|
| *G06F 21/00* | (2013.01) |
| *G06F 21/56* | (2013.01) |
| *G06F 21/57* | (2013.01) |
| *G06F 21/64* | (2013.01) |

(52) U.S. Cl.
CPC .......... *G06F 21/562* (2013.01); *G06F 21/566* (2013.01); *G06F 21/57* (2013.01); *G06F 21/64* (2013.01); *G06F 2221/2147* (2013.01)

(58) Field of Classification Search
CPC ...... G06F 21/562; G06F 21/566; G06F 21/57; G06F 21/64; G06F 2221/2147; H04L 63/14; H04L 9/06
USPC .......................................................... 726/23
See application file for complete search history.

(56) References Cited

U.S. PATENT DOCUMENTS

| | | | |
|---|---|---|---|
| 7,865,484 B2 * | 1/2011 | Wilson | H04N 1/32133 707/694 |
| 7,921,296 B2 * | 4/2011 | Haitsma | G10H 1/0058 713/168 |
| 9,202,050 B1 * | 12/2015 | Nachenberg | G06F 21/56 |
| 2005/0132184 A1 | 6/2005 | Palliyil et al. | |
| 2009/0083852 A1 | 3/2009 | Kuo et al. | |
| 2011/0055179 A1 * | 3/2011 | Arena | H04L 9/3239 707/698 |
| 2013/0246378 A1 | 9/2013 | Hearnden et al. | |
| 2017/0193230 A1 * | 7/2017 | Jevnisek | G06F 21/564 |
| 2019/0080079 A1 * | 3/2019 | Yi | G06F 8/61 |
| 2020/0410616 A1 * | 12/2020 | Theunis | G06Q 20/3674 |

OTHER PUBLICATIONS

Search Report issued by the UK Intellectual Property Office in Application No. GB1908462.3, dated Oct. 4, 2019, 1 page.

* cited by examiner

*Primary Examiner* — Josnel Jeudy
(74) *Attorney, Agent, or Firm* — Meunier Carlin & Curfman LLC

(57) ABSTRACT

A method of scanning files for malware on a computer system. The method comprises detecting a file to be scanned for malware in the computer system, determining the file being a partial file that comprises only a part of the file content, searching for an original clean file associated with the partial file, wherein the original clean file is a full copy of the partial file, based on finding a candidate original clean file associated with the partial file, calculating a partial hash of the same length as the partial file for the candidate original clean file, and based on determining that partial hashes of the candidate original clean file and the partial file match, signalling a false alarm.

19 Claims, 2 Drawing Sheets

FALSE ALARM DETECTION FOR MALWARE SCANNING

CROSS-REFERENCE TO RELATED APPLICATIONS

This application claims priority to, and the benefit of, United Kingdom Patent Application No. 1908462.3, filed Jun. 13, 2019, which is incorporated by reference herein in its entirety.

TECHNICAL FIELD

The present invention relates to the detection of false alarms in malware scanning systems, and in particular, though not necessarily, to the detection of false alarms in automated malware scanning systems.

BACKGROUND

The term "malware" is short for malicious software and is used as a term to refer to any software designed to infiltrate or damage a computer system without the owner's informed consent. Malware can include viruses, worms, trojan horses, rootkits, adware, spyware and any other malicious and unwanted software.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Computer devices make use of anti-virus software to detect and possibly remove malware. This anti-virus software can make use of various methods to detect malware including scanning, integrity checking and heuristic analysis. Of these methods, malware scanning involves the anti-virus software examining files for a virus fingerprint or "signature" that is characteristic of an individual malware program. Typically, this requires that the anti-virus software has a database containing the signatures. When the provider of the anti-virus software identifies a new malware threat, the threat is analysed and its signature is extracted. The malware is then "known" and its signature can be supplied as updates to the anti-virus software database.

In order to detect malware and generate signatures for distribution to client terminals, a "back-end" operation of a malware detection application provider will process large numbers of files and code samples, applying significantly more computational effort than is available at the client terminals. In some cases, this may involve a manual analysis of files and code samples at the back-end. Of course, a goal of the application providers is to automate the malware backend detection process as much as possible, whilst at the same time minimising the risk of false alarms.

SUMMARY

It is an object of the present invention to provide a false alarm detection process for an automated, or at least partially automated, malware detection scheme.

According to a first aspect of the present invention there is provided a method as specified in claim 1.

The invention makes it possible to reduce the need for manual intervention in a malware detection process, whilst at the same time alerting a service provider and/or user to potential false alarms. In the case of the service provider, the invention allows the provider to distribute a more reliable product or service.

The computer system of the invention may be a server or set of servers, e.g. operated by the provider of a malware detection service. Alternatively, the computer system may be a client computer, e.g. owned by an end user.

According to a second aspect of the present invention there is provided computer system as specified in claim 10.

According to a third aspect of the present invention there is provided computer program as specified in claim 19.

According to a fourth aspect of the present invention there is provided computer program storage medium as specified in claim 20.

DETAILED DESCRIPTION

A typical back-end detection process carried out by a provider of malware detection application receives and analyses hundreds or even thousands of software files (including complete applications and code samples) every day. These files may be obtained for example by spiders searchers the world wide web, or may be delivered to the backend from client terminals running the providers detection applications. The task of the back-end operation is to rapidly detect new malware that is in the "wild", to generate a signature for that malware and distribute it to client terminals, and, if possible, generate and distribute a disinfection mechanism. It is desirable to automate these processes as much as possible.

Considering the malware detection process, when a new file is received at the back-end, servers running there will take the file and determine whether it contains known malware and/or whether it exhibits behaviour or has properties that are suspicious, i.e. typical of malware. However, partial files are at high risk of generating false alarms as when a client browser downloads a file and writes a partial file to a disk, it is basically written at an arbitrary length. This means that a full file whitelisting does not work and since the partial file is not yet whole, a code signing signature check would not work either. If client terminals are advised that a clean file is suspected of being malware, this will give rise to a number of undesirable consequences, including customer frustration and dissatisfaction with the scanning application and an increased requirement for technical support from the application provider.

It is proposed here to seek to detect false alarms resulting from an automated scan of files for malware by performing a further determination to suppress false alarms caused by partial files.

Figure 1:
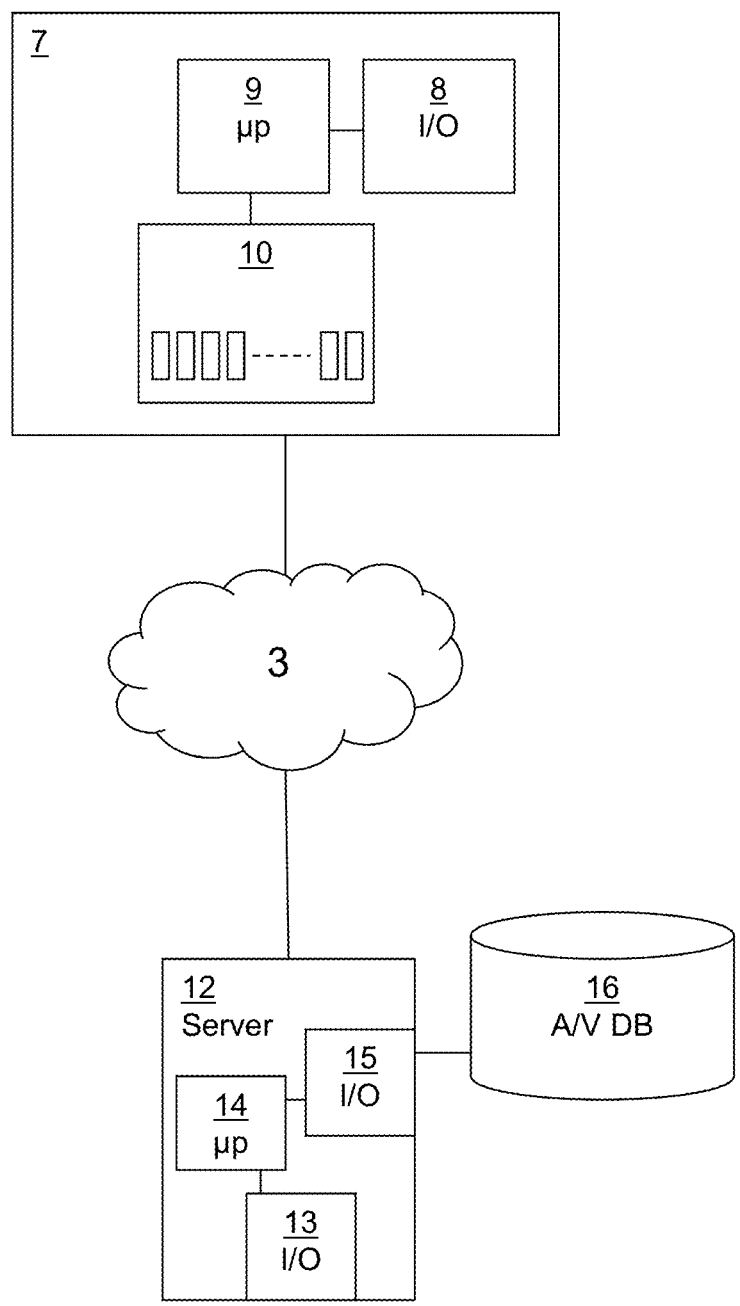
FIG. 1 illustrates schematically in a block diagram a network architecture according to an embodiment of the invention.

FIG. 1 illustrates schematically a part of a computer network into which a computer system has been installed. Also any other computer system that is able to implement the embodiments of the invention can be used instead or in addition to the system used in this example. A client device 7 is connected to a security service network, here security backend/server 12 through the cloud 3. The security backend/server 12 may be separated from the cloud 3 by a gateway or other interface (not shown) or other network elements appropriate for the backend 12. The client device 7 may also be separated from the cloud 3 by a gateway or other interface. Other network structures are also envisaged.

The client device 7 typically comprises an I/O device 8, a processor 9 and a file system 10. The remote server 12 has an I/O device 13 for communication with the client device 7, a processor 14, and an I/O device 15 for communicating with a remote anti-virus database 16. Note that the database may be located at the server 12. Files stored in the file system 10 may be scanned remotely by checking against the remote anti-virus database 16. This eliminates the need to distribute a large anti-virus signature databases to every client, and allows updates to be entered into the remote anti-virus 16 database quickly, allowing a very quick response to new threats.

Whilst it is expected that at least part of the false alarm detection mechanism proposed here will be implemented in the back-end operation of a malware detection application provider, it is of course possible to additionally, or even alternatively, implement it at the client front-ends, i.e. to implement the mechanism in the software products that are provided to customers/subscribers. In this case, the detection of a possible false alarm may result in one or more of the following actions: 1) a file being passed as clean (only if the mechanism is sufficiently trusted); 2) an alert being presented to the user; and 3) details of the false alarm being passed to the provider's back-end. Action 3) may involve quarantining the file at the client terminal until such time as the back-end has performed a further analysis on the file and a result returned to the client terminal.

Figure 2:
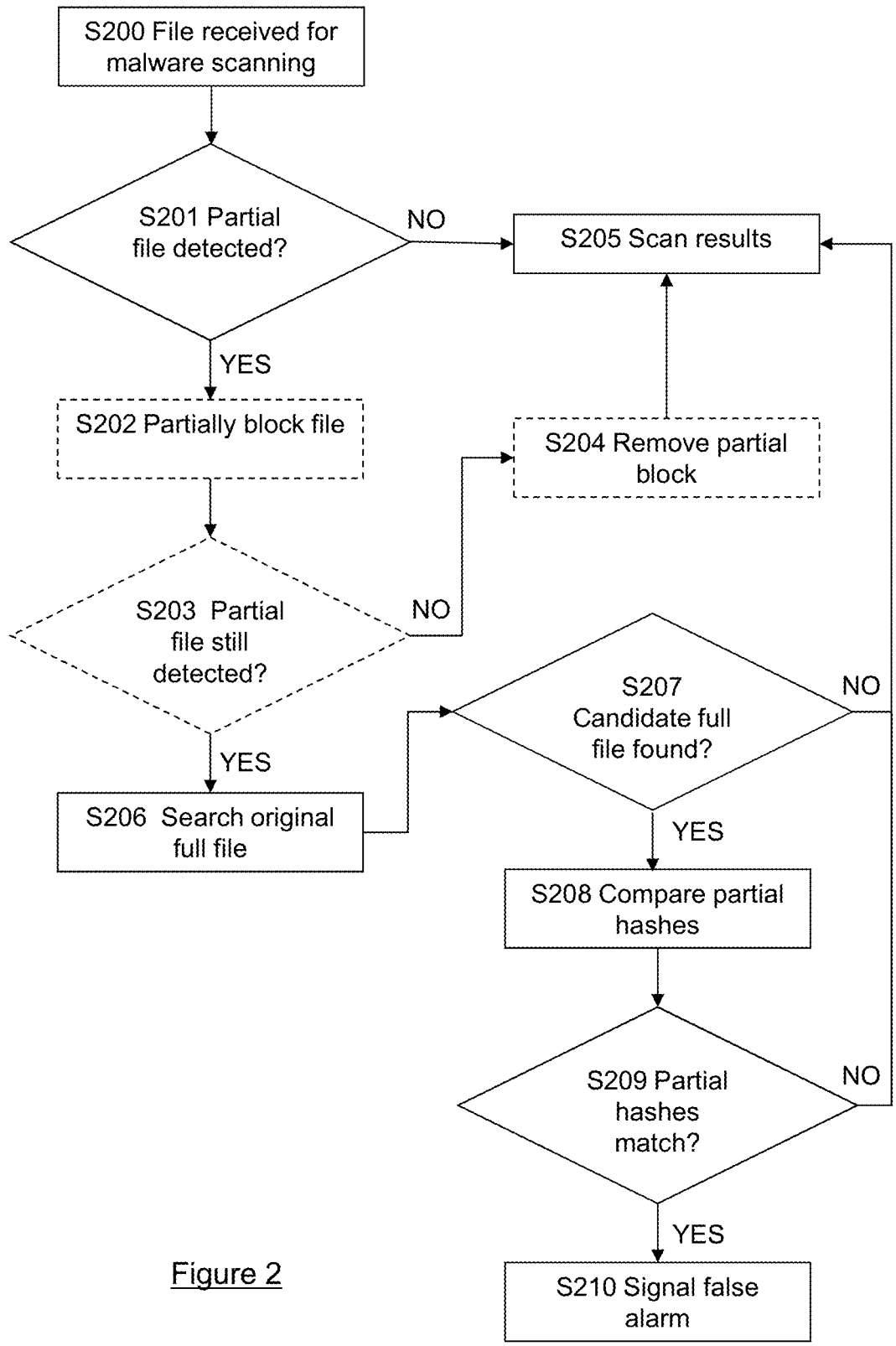
FIG. 2 is a flow diagram showing the steps of an embodiment of the invention.

FIG. 2 is a flow diagram illustrating procedures for detecting malware in software files. Typically, upon receipt of a file at a scanning server the server may perform the "conventional" malware scan using, typically, a plurality of malware scanning engines to ensure maximum detection rates. Assuming a fully automated system, files that are not suspected of being malware as a result of the scan are identified as clean. In the example diagram of FIG. 2, some of the steps are shown with dashed lines (S202, S203, S204) to illustrate optional method steps. It is also noted that some of the method steps can be omitted or carried out in different parts of the flow depending on the specific implementation.

According to an embodiment of the present invention, after receiving a file to be scanned for malware in the computer system, in S200, it is further determined, in S201, whether the file is a partial file that comprises only a part of the file content. In an embodiment, determining that the file is a partial file comprises determining whether or not the file possesses properties that are indicative of the file being a partial file. For example, a partial file may be detected based on determining whether or not the file contains a part file extension and/or determining whether or not the file is written by a web browser or other component that is used to download files and/or determining whether or not a file format header indicates that the size of the file should be larger than what is currently on a disk. The file format header may be a Portable Executable (PE), Android DEX header or Java JAR directory index, for example.

If, in S201, the file is determined to be a partial file, then S202 may be entered where the file is partially blocked. Partial block means that writing to the file is allowed either by all processes or by the process that last wrote to the file. However, execution of the file is not allowed. Execution prevention may be implemented by temporarily modifying file access rights for example. In another embodiment, monitoring and blocking any execution attempts on the file may be made during the partial blocking of the file.

In case the file is partially blocked, then in S203, it is determined whether the partial file can still be detected. In an embodiment, a predetermined period of time is awaited to see if more of the partial file content is being written before rechecking whether the partial file can still be detected. If the recheck confirms that the partial file can no longer be detected, then S204 is entered where the partial block for the file is removed.

If, in S203, it is determined that the partial file is still present, then S206 is entered where an original clean file associated with the partial file is searched for. The original clean file is a full copy of the partial file that is not missing any file content. In an embodiment, the original clean file is searched by using file name or file metadata fields, such as PE or other file header information to identify potential (candidate) matches. Example methods to identify the candidate original clean file associated with the partial file may comprise: checking all matches by file name without .part or other partial file indicator, having precalculated database of partial hashes (for example first 4k), having precalculated index by PE checksum or other file header checksum field.

If the search is successful and the candidate original clean file associated with the partial file is found (S207), then S208 is entered. Otherwise, S205 may be entered for malware scan results. In S208, based on finding the candidate original clean file associated with the partial file, a partial hash of the same length as the partial file is calculated for the candidate original clean file and the partial hashes of the candidate original clean file and the partial file are compared with each other.

If, in S209, it is determined that the partial hashes of the candidate original clean file and the partial file match, a false alarm can be signalled in S210. Otherwise, S205 may be entered.

In the following use case example, a clean file database and a security cloud backend is leveraged to implement the false alarm detection mechanism according to an embodiment. In this example, when a client computer, such as an endpoint protection client, reports security cloud backend of a detected file which has indications of being a partial download file or otherwise truncated file, the complete version of the file is located from the clean file database by the security cloud backend and a partial file hash for the length of the detected file is calculated. If the partial clean file hash and the calculated hash from the detected file match, then the false alarm may be suppressed. The example method starts, for example, by the client computer detecting a file and then checking whether the detected file could be a partial file. If indications of the file being a partial file are detected, then the client computer may first partially block the file and wait if more of the file is being written and then recheck the file with antivirus or other scanning function. If the file is no longer detected, the partial block can be removed. If the file is still detected, the client computer may either send metadata about the file or the whole file to the security cloud backend for checking. After receiving data relating to the detected partial file at the security cloud backend, the backend tries to find the original file by using file name or file metadata fields, for example. If the security cloud backend identifies a file or files that are possible full copies of the detected partial file, then the security cloud backend calculates a hash of the same length as the partial file. Finally, if the partial hashes of the clean and detected file match, the detection of the partial file may be determined to be a false alarm and may thus be suppressed.

Any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 2 above, i.e. by one or more processors, one or more memories, one or more interfaces, or any combination thereof.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

It will be appreciated by the person of skill in the art that various modifications may be made to the above described embodiments without departing from the scope of the present invention.

The invention claimed is:

1. A method of scanning files for malware and reducing false alarms on a computer system, the method comprising:
   detecting, by a processor, a file to be scanned for malware in the computer system;
   determining, by the processor, the file being a partial file that comprises only a part of the file content;
   searching, by the processor, for an original clean file associated with the determined partial file, wherein the original clean file is a full copy of the partial file;
   based on finding a candidate original clean file associated with the partial file, calculating, by the processor, a partial hash of the same length as the partial file for the candidate original clean file; and
   based on determining that partial hashes of the candidate original clean file and the partial file match, signalling, by the processor, a false alarm.

2. The method according to claim 1, wherein said computer system comprises a server or set of servers.

3. The method according to claim 1, wherein said computer system comprises a client computer.

4. The method according to claim 1, wherein said step of determining the file being a partial file comprises determining whether or not the file possesses properties that are indicative of the file being a partial file.

5. The method according to claim 1, wherein said step of determining the file being a partial file comprises one or more of:
   determining whether or not the file contains a .part file extension;
   determining whether or not the file is written by a web browser or other component that is used to download files; and
   determining whether or not a file format header indicates that the size of the file should be larger than what is currently on a disk.

6. The method according to claim 1, further comprising partially blocking the file after determining the file being a partial file, wherein partially blocking the file comprises allowing writing to the file and preventing execution of the file.

7. The method according to claim 6, further comprising waiting for a predetermined time period whether more file content is written to the partial file, then rechecking the file and removing the partial block based on not detecting the partial file any more.

8. The method according to claim 1, further comprising transmitting data relating to the partial file from a client computer to a server for searching the original clean file associated with the partial file.

9. The method according to claim 1, wherein the step of searching for the original clean file associated with the partial file is based on at least one or more of: checking all matches by file name without .part or other partial file indicator, having precalculated database of partial hashes, having precalculated index by PE checksum or other file header checksum field.

10. A computer system comprising:
    one or more processors; and
    a memory having instructions stored thereon, wherein executed by the one or more processors causes the one or more processor to:
       detect a file to be scanned for malware in the computer system;
       determine the file being a partial file that comprises only a part of the file content;

search for an original clean file associated with the partial file, wherein the original clean file is a full copy of the partial file;

based on finding a candidate original clean file associated with the partial file, calculate a partial hash of the same length as the partial file for the candidate original clean file; and based on determining that partial hashes of the candidate original clean file and the partial file match, signal a false alarm to reduce false alarms.

11. The computer system according to claim 10, wherein said computer system comprises a server or set of servers.

12. The computer system according to claim 10, wherein said computer system comprises a client computer.

13. The computer system according to claim 10, wherein the one or more processors are configured to determine the file being a partial file by determining whether or not the file possesses properties that are indicative of the file being a partial file.

14. The computer system according to claim 10, wherein the one or more processors are configured to determine the file being a partial file by one or more of:

determining whether or not the file contains a .part file extension;

determining whether or not the file is written by a web browser or other component that is used to download files;

determining whether or not a file format header indicates that the size of the file should be larger than what is currently on a disk.

15. The computer system according to claim 10, wherein the one or more processors are further configured to partially block the file after determining the file being a partial file, wherein partially blocking the file comprises allowing writing to the file and preventing execution of the file.

16. The computer system according to claim 15, wherein the one or more processors are further configured to wait for a predetermined time period whether more file content is written to the partial file, then recheck the file and remove the partial block based on not detecting the partial file any more.

17. The computer system according to claim 10, wherein the one or more processors are further configured to transmit data relating to the partial file from a client computer to a server for searching the original clean file associated with the partial file.

18. The computer system according to claim 10, wherein the one or more processors are configured to search for the original clean file associated with the partial file based on at least one or more of: checking all matches by file name without .part or other partial file indicator, having precalculated database of partial hashes, having precalculated index by PE checksum or other file header checksum field.

19. A non-transitory computer readable medium having a computer program stored thereon, the computer program comprising computer readable code which, when run on a computer system or server, causes the computer system or server to act as a computer system or server configured to:

detect a file to be scanned for malware in the computer system;

determine the file being a partial file that comprises only a part of the file content;

search for an original clean file associated with the partial file, wherein the original clean file is a full copy of the partial file;

based on finding a candidate original clean file associated with the partial file, calculate a partial hash of the same length as the partial file for the candidate original clean file; and based on determining that partial hashes of the candidate original clean file and the partial file match, signal a false alarm to reduce false alarms.

\* \* \* \* \*